United States Patent [19]
Canard et al.

[11] Patent Number: 6,163,081
[45] Date of Patent: Dec. 19, 2000

[54] ARRANGEMENT FOR LONGITUDINALLY IMMOBILIZING A DATA MEDIUM IN A DATA INTERCHANGE DEVICE

[75] Inventors: Louis Canard, Nevers; Philippe Garcin, Marzy, both of France

[73] Assignees: Valeo Securite Habitacle, Creteil; Renault, Boulogne-Billiancourt, both of France

[21] Appl. No.: 09/329,158

[22] Filed: Jun. 9, 1999

[30] Foreign Application Priority Data

Jun. 9, 1998 [FR] France .................................. 98 07250

[51] Int. Cl.[7] ...................................................... B60L 1/00
[52] U.S. Cl. .............................................. 307/10.1; 307/9.1
[58] Field of Search ...................................... 307/9.1, 10.1; 70/237, 258, 336, 387, 388, 389, 255, 275, 277, 278, 413, 405, 58, 252, 186; 361/170, 172

[56] References Cited

U.S. PATENT DOCUMENTS

| | | | |
|---|---|---|---|
| 3,851,505 | 12/1974 | Wilkinson | 70/255 |
| 4,489,359 | 12/1984 | Suzuki | 361/172 |
| 5,982,295 | 11/1999 | Goto et al. | 340/825.54 |

*Primary Examiner*—Stephen W. Jackson
*Assistant Examiner*—Sharon Polk
*Attorney, Agent, or Firm*—Morgan & Finnegan LLP

[57] ABSTRACT

The invention proposed an arrangement of the type comprising a unit into which the medium is introduced manually, and the type in which a device comprises means for longitudinally holding the data medium in an active position and means providing assistance with introducing and extracting the data medium, wherein the data medium has a window, and where the unit comprises a lever for immobilizing the medium which is mounted so that it can pivot, between a stable immobilizing position towards which the immobilizing lever is elastically returned and in which an immobilizing finger of the immobilizing lever extends vertically into the window, and a stable retracted position, to allow the data medium to be extended from the unit.

12 Claims, 2 Drawing Sheets

ARRANGEMENT FOR LONGITUDINALLY IMMOBILIZING A DATA MEDIUM IN A DATA INTERCHANGE DEVICE

BACKGROUND OF THE INVENTION

The present invention relates to an arrangement for the interchange of data between a rigid or semi-rigid data medium and a data interchange device, particularly a reader of data contained in the medium.

SUMMARY OF THE INVENTION

The invention relates more particularly to such an arrangement intended to be fitted to a motor vehicle and in which the data medium, which is, for example, in the form of a card or badge of rectangular overall shape, carries data identifying the user of the vehicle which, when he or she introduces his or her badge into the reading device, authorizes him or her to use the vehicle by, in particular, allowing him or her to start the vehicle engine.

Numerous examples of such arrangements in which the data medium is a rigid or semi-rigid card comprising, for example, an integrated circuit, or chip, which is connected to reading means of the device by electrical contacts and/or by a data interchange antenna, are known.

When the badge or the card is introduced into the device, the card is introduced manually into a housing in the unit in which the data medium occupies a determined active position, and the device which receives the card or the badge comprises means for longitudinally holding this data medium in an active position in the unit so that data interchange can occur correctly.

In the most widespread design, these holding means consist of simple brakes, that is to say that there are elastically deformable tabs which cooperate by friction with lateral edges and/or with the large faces of the card.

Such a design of the means for holding the data medium in the reading device is not entirely satisfactory for applications to motor vehicles where, as the vehicle travels along, the device is subjected to a great deal of vibration which gradually causes the data medium to be ejected or at the very least to shift from its active, so-called reading position.

In addition, in the case of applications to motor vehicles, it is necessary to be able not only to hold the data medium in an active position, but also to lock it by immobilizing it in this position, in response to a locking command, so as to prevent the driver or a passenger from being able to extract the data medium from the reading device at an inopportune moment under certain vehicle use configurations.

In order to improve the convenience of use of such an arrangement, it has already been proposed that means be provided to assist with introducing the data medium into the device and/or extracting it therefrom.

To this end, it has already been proposed that the device should comprise a motorized slide into which the card is inserted manually and which is then electrically made to move between its position of rest in which the card is introduced and an active reading position in which the slide brings the card to face reading means.

Such a design is complex and cumbersome and ill-suited to being incorporated into an application for a motor vehicle.

With a view to providing means for assisting with ejection, numerous applications have also been proposed in which the user, on introduction, works against a return spring which stores up energy, the card being immobilized in the active position by operated retaining means, the spring, previously stressed, restoring the energy with a view to assisting with the extraction of the card, it being possible for this assistance to go so far as to completely eject the card from the housing in the unit.

Such a design is not entirely satisfactory either insofar as it requires significant effort at the end of the travel of introducing the card and insofar as the known means of retention against the force applied to the card by the elastic return means are not suited to applications to motor vehicles, as there is the risk that as the vehicle is driven along, the vibration will trigger these means and eject the card at a dangerous and inopportune moment.

In order to overcome the drawbacks just mentioned, the invention proposes an arrangement for the interchange of data between a rigid or semi-rigid data medium and a data interchange device, particularly a reader of data contained in the medium, of the type comprising a unit into which the medium, generally in the form of a card, is introduced manually into a housing in the unit in which it occupies a determined active position, and of the type in which the device comprises means for longitudinally holding the data medium in an active position in the unit and means providing assistance with introducing and extracting the data medium, characterized in that the data medium has a window, and in that the unit comprises a lever for immobilizing the medium which is mounted so that it can pivot, about an axis, between a stable immobilizing position towards which the immobilizing lever is elastically returned and in which an immobilizing finger formed at the free end of one arm of the immobilizing lever extends vertically into the window, and a stable retracted position towards which the immobilizing lever is elastically returned and in which the immobilizing finger is outside the window, to allow the data medium to be extracted from the unit.

According to other features of the invention:

the immobilizing lever is parallel to the plane in which the longitudinal direction of introduction of the data medium lies;

the immobilizing lever is elastically returned towards its two stable, immobilizing and retracted, positions, by a bistable spring;

the axis of pivoting of the immobilizing lever is perpendicular to the longitudinal direction of introduction of the data medium;

when introducing the data medium into the unit, the pivoting of the immobilizing lever from its retracted stable position is brought about by cooperation between a front transverse edge of the data medium and a rear cam profile of an operating finger of the immobilizing lever which is angularly offset with respect to the immobilizing finger;

when extracting the data medium, the pivoting of the immobilizing lever from its stable immobilizing position is brought about by the cooperation between a front transverse edge of the window and a front cam profile of the immobilizing finger;

when the immobilizing lever is in the immobilizing position, the longitudinal distance between the rear cam profile of the operating finger and the front cam profile of the immobilizing finger is substantially equal to the longitudinal distance between the front transverse edge of the data medium and the front transverse edge of the window;

the device comprises an operated member for locking the immobilizing lever in its angular position in which it immobilizes the data medium;

the operated locking member is an electromagnet, the core plunger of which constitutes a locking finger which can be made to project from the housing of the electromagnetic to extend out facing a part of the immobilizing lever so as to prevent the latter from rotating from its immobilizing position into its retracted position;

the axis of displacement of the core plunger of the electromagnet is parallel to the axis of pivoting of the immobilizing lever;

the bistable spring is a hairpin spring, a first transverse main leg of which passes through an off-centred hole in the immobilizing lever, and the second main transverse leg of which is extended by a 180° bend then by a transverse articulating leg which passes through the body of the immobilizing lever to constitute the axis about which this lever is articulated;

the arrangement is fitted to a motor vehicle in which the anti-theft functions are partially or completely fulfilled by data processing, some of which data, contained in the data medium, represents an authorized user or a group of authorized users of the vehicle.

BRIEF DESCRIPTION OF THE DRAWINGS

Other features and advantages of the invention will emerge from reading the detailed description which follows, for an understanding of which reference will be made to the appended drawings in which.

DETAILED DESCRIPTION OF THE INVENTION

Figure 1:
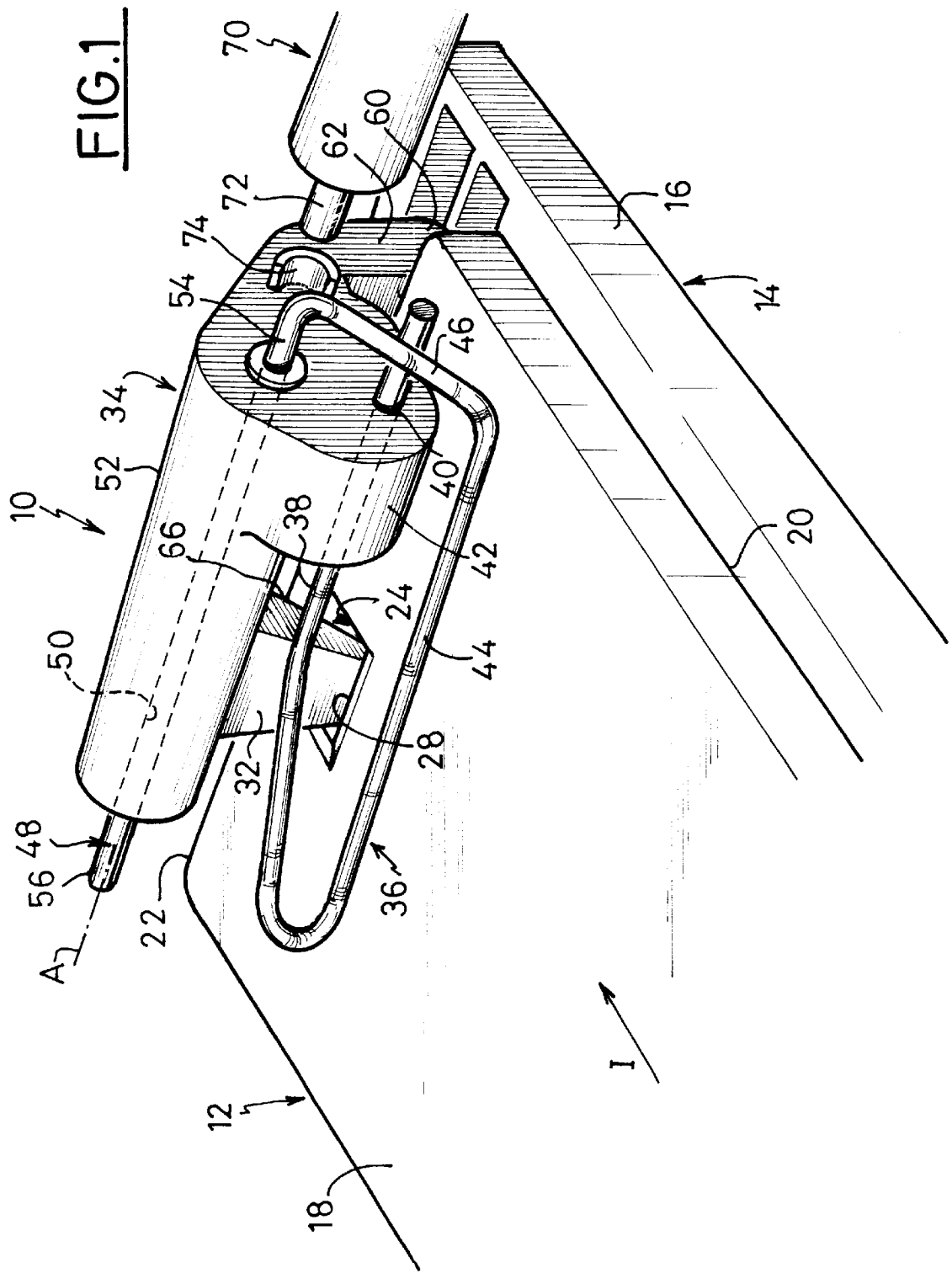
FIG. 1 is a diagrammatic view in perspective on a large scale which illustrates some of the main components in an arrangement in accordance with the teachings of the invention and in which the data medium badge is illustrated in its active longitudinal position in which it is immobilized by the immobilizing finger of the immobilizing lever, the latter not yet being locked by the locking member.

In the description which will follow, the terms "vertical", "horizontal", "upper", "lower", "front", "rear", etc are used with reference to the figures to make the description and the claims easier to understand, this all being without implied limitation.

The arrangement 10 in accordance with the teachings of the invention and illustrated in the figures essentially consists of a data medium or badge 12 and of a unit 14 only a lower plate 16 of which has been depicted.

The badge 12 in this case is a rigid element of rectangular overall shape and of small thickness which, near its rear longitudinal edge (not depicted) has a part for gripping, allowing it to be handled and in particular slid parallel to its overall plane.

The badge 12 is a data medium which can be introduced longitudinally, that is to say in the direction I parallel to the overall plane of its upper 18 and lower 20 large faces, into the unit 14 and which can be extracted from this unit in the same direction but in the opposite sense.

The means for guiding the sliding of the badge 12 in the unit 14, which are of a known overall design, are not depicted in the figures and will not be described in detail.

As can be seen in the figures, the badge 12 has, at its front part, and near to its front transverse edge 22, a window 24 of rectangular outline and the sides of which are parallel to those of the badge 12.

The window 24 extends vertically into the badge and passes right through it.

Figure 2:
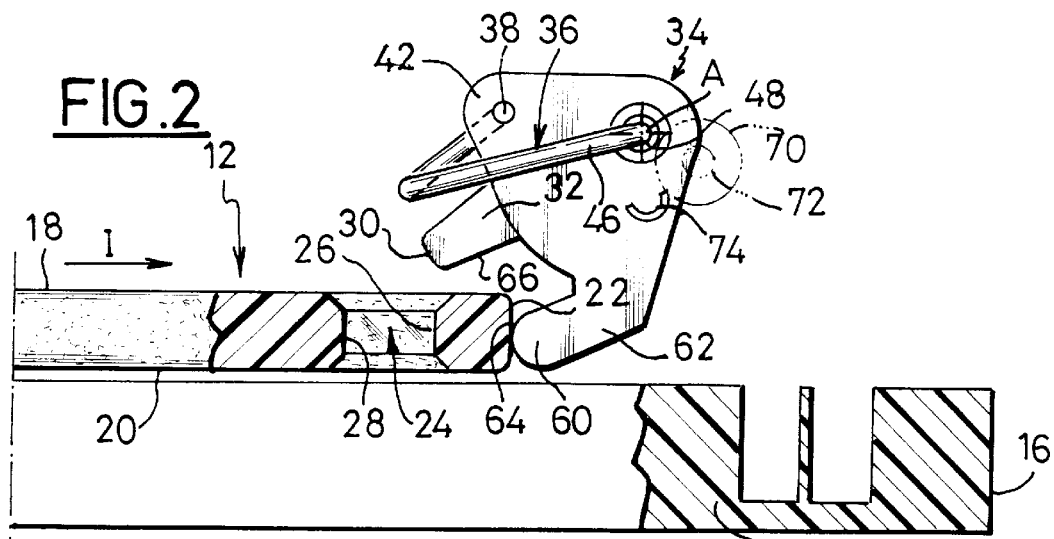
FIG. 2 is a side view, in partial longitudinal section, of the components illustrated in FIG. 1, in which the immobilizing lever is illustrated in its retracted stable position with the badge that forms the data medium just coming into contact with it as it is introduced.

More specifically, and as can be seen in particular in FIG. 2, the window 24 is longitudinally bounded by two, front 26 and rear 28, parallel transverse edges, these two edges having upper and lower chamfers as can be seen in the figures.

The window 24 is an immobilizing window within the meaning of the invention, that is to say it is intended to house an immobilizing member borne by the unit 15 and which will now be described in detail with reference to the figures.

The member for immobilizing the badge 12 in the active position is an immobilizing finger 30 formed at the free end of an immobilizing arm 32 belonging to an immobilizing lever 34 which is mounted so that it can pivot with respect to the unit about a transverse axis A which is perpendicular to the direction I and parallel to the plane which contains this direction I, that is to say parallel to the overall plane of the badge 12 which forms the medium for the data.

Figure 4:
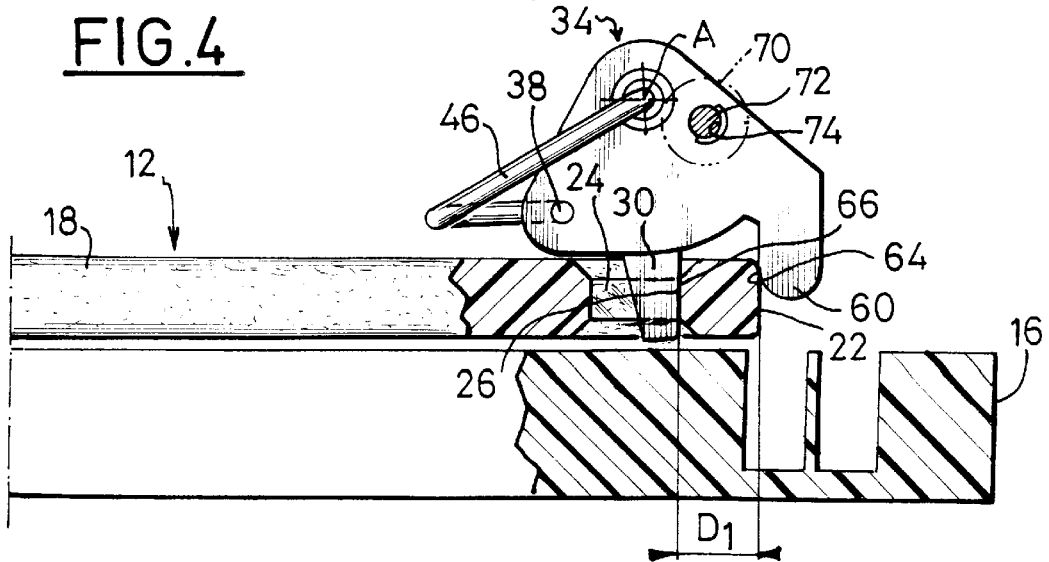
FIG. 4 is a view similar to those of FIGS. 2 and 3 in which the immobilizing lever is in its immobilizing position with the badge in the active reading position.

The axis A of pivoting of the lever 34 is therefore fixed and the immobilizing lever 34 is mounted so that it can pivot in both directions about this axis between two stable extreme angular positions which are illustrated in FIG. 2 and in FIGS. 1 and 4 respectively.

These two positions are two stable positions towards each of which the immobilizing lever 34 is angularly returned elastically by a bistable return spring 36.

In the embodiment illustrated in the figures, the spring 36 is a bent wire spring in the overall shape of a hairpin.

The hairpin has a transversely orientated first main leg 38 which is off-centred with respect to the axis A and which is offset towards the rear with respect to this axis to extend into a transversely orientated housing 40 formed in a radial tab 42 of the immobilizing lever 34.

The second transverse main leg 44 of the bistable spring 36 is longitudinally offset towards the rear with respect to the first leg 38 and is extended by a 180° bend 46, then by a transverse articulating leg 48 which extends through a drilling 50 in the body 52 of the immobilizing lever 34.

Thus, the leg 48 constitutes the axis or spindle on which the lever 34 is articulated about the geometric axis A and, for this purpose, its opposite transverse ends 54 and 56 are housed in bearings (not depicted) in the unit of the device which takes the badge 12.

The first stable position of the bistable spring 36, illustrated in FIG. 2, defines the first, retracted, stable position of the immobilizing lever 34, in which its immobilizing lever 30 is retracted, that is to say does not extend facing the plane in which the badge 12 moves, and nor of course does it extend into the immobilizing window 24.

As can be seen in the figures, the immobilizing lever 34 also comprises an operating finger 60 which is formed at the free end of an operating arm 62 belonging to the immobilizing lever 34 and which is angularly offset, in the anti-clockwise direction when considering FIG. 2, with respect to the immobilizing finger 30 and which is transversely offset with respect to the latter as can be seen in FIG. 1.

As can be seen in the figures, in longitudinal section, the operating finger 60 has a rounded profile so that it can cooperate in the manner of a cam, via its rear face 64, with the front transverse edge 22 of the badge 12.

In the same way, in longitudinal section, the front edge 66 of the immobilizing finger 30 is inclined so as to make a ramp forming a cam capable of cooperating with the front transverse edge 26 of the slot 24.

In accordance with the teachings of the invention, the arrangement also comprises means of locking the immobilizing lever 34 in the stable immobilized position.

In the embodiment illustrated in the figures, the locking means are illustrated diagrammatically in the form of an electromagnet 70, the core plunger (not depicted) of which can operate a locking rod, or finger, 72 which is normally partially retracted into the body of the electromagnet 70 (see FIG. 1) and which, in the locked position, projects transversely outwards, that is to say in a direction parallel to the axis A of articulation of the immobilizing lever 34, to extend facing a transverse extension 74 of the body 52 of the immobilizing lever 34 in order then to prevent any pivoting of the latter in the clockwise direction from its immobilizing position illustrated in FIG. 4.

The operation of the arrangement according to the invention will now be described with reference to FIGS. 2 to 4.

When there is no badge 12 in the unit of the device, the immobilizing lever 34, under the action of the bistable spring 36, is in its position illustrated in FIG. 2 in which the operating finger 60 extends along the path of the badge 12, that is to say facing the front transverse edge 22 thereof.

When a badge 12 is introduced longitudinally in the direction I, that is to say from left to right if looking at FIG. 2, the front transverse edge 22 of the badge 12 will cooperate with the cam-forming rear face 64 thereof to cause the immobilizing lever 34 to pivot in the anticlockwise direction against the elastic force applied to it by the spring 36 which tends to return it towards its first, retracted, stable position illustrated in FIG. 2.

Figure 3:
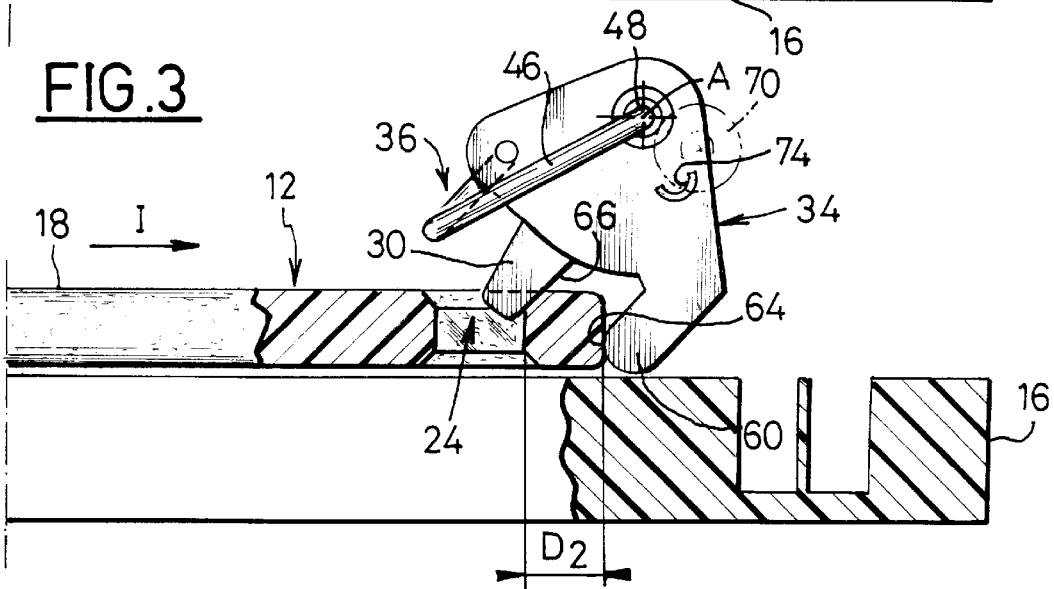
FIG. 3 is a view similar to that of FIG. 1 which illustrates an intermediate position of the immobilizing lever and of the badge during the introduction of the latter.

The longitudinal movement of introducing the badge 12 continues in accordance with what is illustrated in FIG. 3, in which it can be seen that the immobilizing finger 30 has begun to partially enter the immobilizing window 24 as the badge 12 gradually moves forwards, and this accordingly causes the immobilizing lever 34 to rotate anticlockwise.

Beyond the intermediate position illustrated in FIG. 3, the initial stable condition of the bistable spring 34 will be exceeded and this spring will abruptly change state to reach its second stable state illustrated in FIG. 4.

Thus, the abrupt change in state of the bistable spring 34 causes an abrupt pivoting of the immobilizing lever 34 which then reaches its stable immobilizing position illustrated in FIG. 4.

During this abrupt pivoting movement, the immobilizing finger 30 (independently of the force which may continue to be applied to it by the user of the badge 12 with a view to introducing it) carries the badge 12 along longitudinally forwards because of the cooperation between the front edge 66 of the immobilizing finger 30 and the front transverse edge 26 of the window 24.

As can be seen in FIGS. 3 and 4, the longitudinal distance D1 between the rear cam profile 64 of the operating finger 60 and the front cam profile 66 of the immobilizing finger 30 is substantially equal to the longitudinal distance D2 between the front transverse edge 22 of the badge 12 and the front transverse edge 26 of the window 24.

As a result of this, the stable immobilizing position of the immobilizing lever 34 determines, with practically no play, the immobilized stable position of the badge 12 in the unit 14, that is to say in particular with respect to the plate 16.

In the stable immobilizing angular position illustrated in FIGS. 1 and 4, it is then possible to lock the immobilizing lever 34 in this immobilizing position by causing full deployment of the locking finger 72 which will occupy its position illustrated in FIG. 4 in which it extends facing the concave thrust surface 74. It is then therefore impossible to cause the immobilizing lever 34 to pivot clockwise, that is to say that it is therefore impossible to make the lever 34 pivot from its immobilizing position towards its retracted position.

When there is the desire to extract the badge 12 from the data reading and interchange device, the first step must be to retract the locking finger 72.

Then, starting from the angular position illustrated in FIGS. 1 to 4, the user extracts the badge 12 longitudinally forwards, that is to say from right to left when looking at FIG. 4.

During the extraction movement, the front transverse edge 26 of the window 24 acts on the front edge 66 of the immobilizing finger 34 to cause the immobilizing lever 34 to pivot clockwise.

During this clockwise pivoting movement, the bistable spring 36 will gradually be deformed until it leaves its second stable state illustrated in FIG. 4 and reverts abruptly to its first stable state illustrated in FIG. 2. This reverse abrupt pivoting movement therefore causes the abrupt pivoting of the immobilizing lever 34 as far as its retracted position illustrated in FIG. 2 in which the operating finger 30 is no longer housed in the immobilizing window 24 and in which it is therefore possible freely to extract the badge 12 from the device which previously accommodated it.

The bistable spring 36 therefore in this way constitutes an economical means of assisting with the introduction and extraction of the badge, as was explained earlier.

In addition, and this is not depicted in the figures, it is possible to provide a fixed stop in the unit of the device, which determines a maximum longitudinal position for the introduction of the badge 12 into the device in order, in particular, to prevent the user from exerting a harmful force of the bistable spring 36 beyond the second stable state thereof illustrated in FIG. 4.

Apart from the assistance function mentioned earlier, the bistable spring 36 also provides a tactile sensation to the user upon introduction and upon extraction.

The invention is particularly applicable on board motor vehicles in which the anti-theft functions are partially or completely fulfilled by data processing, some of which data, contained in the medium or badge 12, represents an authorized user or a group of authorized users, of the vehicle.

The data processing is, in particular, aimed at comparing the data contained in the badge 12 with data stored in memory on board the vehicle with a view to allowing authorized use of the vehicle, the processing circuit or circuits providing complete or partial control of anti-theft means, whether these be conventional anti-theft means, that is to say means which act on the vehicle steering column and/or means preventing the vehicle engine from being started and/or interrupting the running of the engine.

What is claimed is:

1. An arrangement for the interchange of data between a rigid or semi-rigid data medium and a data interchange device of the type comprising a unit into which the medium is introduced manually into a housing in the unit in which it occupies a determined active position, and of the type in which the device comprises means for longitudinally holding the data medium in an active position in the unit and means providing assistance with introducing and extracting the data medium, wherein the data medium has a window, and the unit comprises a lever for immobilizing the medium which is mounted so that it can pivot, about an axis, between a stable immobilizing position towards which the immobilizing lever is elastically returned and in which an immobilizing finger formed at the free end of one arm of the immobilizing lever extends vertically into the window, and a stable retracted position towards which the immobilizing lever is elastically returned and in which the immobilizing finger is outside the window, to allow the data medium to be extracted from the unit.

2. An arrangement according to claim 1, wherein the axis of pivoting of the immobilizing lever is parallel to the plane in which the longitudinal direction of introduction of the data medium lies.

3. An arrangement according to claim 2, wherein the immobilizing lever is elastically returned towards its two stable, immobilizing and retracted positions, by a bistable spring.

4. An arrangement according to claim 3, wherein the axis of pivoting of the immobilizing lever is perpendicular to the longitudinal direction of introduction of the data medium.

5. An arrangement according to claim 4, wherein when introducing the data medium into the unit, the pivoting of the immobilizing lever from its retracted stable position is brought about by cooperation between a front transverse edge of the data medium and a rear cam profile of an operating finger of the immobilizing lever which is angularly offset with respect to the immobilizing finger.

6. An arrangement according to claim 5, wherein when extracting the data medium, the pivoting of the immobilizing lever from its stable immobilizing position is brought about by the cooperation between a front transverse edge of the window and a front cam profile of the immobilizing finger.

7. An arrangement according to claim 6, wherein when the immobilizing lever is in the immobilizing position, the longitudinal distance between the rear cam profile of the operating finger and the front cam profile of the immobilizing finger is substantially equal to the longitudinal distance between the front transverse edge of the data medium and the front transverse edge of the window.

8. An arrangement according to claim 4, wherein the device comprises an operated member for locking the immobilizing lever in its angular position in which it immobilizes the data medium.

9. An arrangement according to claim 8, wherein the operated locking member is an electromagnet having a core plunger which constitutes a locking finger which can be made to project from the housing of the electromagnet to extend out facing a part of the immobilizing lever so as to prevent the lever from rotating from its immobilizing position into its retracted position.

10. An arrangement according to claim 9, wherein the axis of displacement of the core plunger of the electromagnetic is parallel to the axis of pivoting of the immobilizing lever.

11. An arrangement according to claim 3, wherein the bistable spring is a hairpin spring, a first transverse main leg of which passes through an off-centered hole in the immobilizing lever, and the second main transverse leg of which is extended by a 180° bend then by a transverse articulating leg which passes through the body of the immobilizing lever to constitute the axis about which this lever is articulated.

12. An arrangement according to claim 1, adapted to be fitted to a motor vehicle in which the anti-theft functions are at least partially performed by data processing, some of which data, contained in the data medium, represents an authorized user or a group of authorized users of the vehicle.

* * * * *